Figure 1:
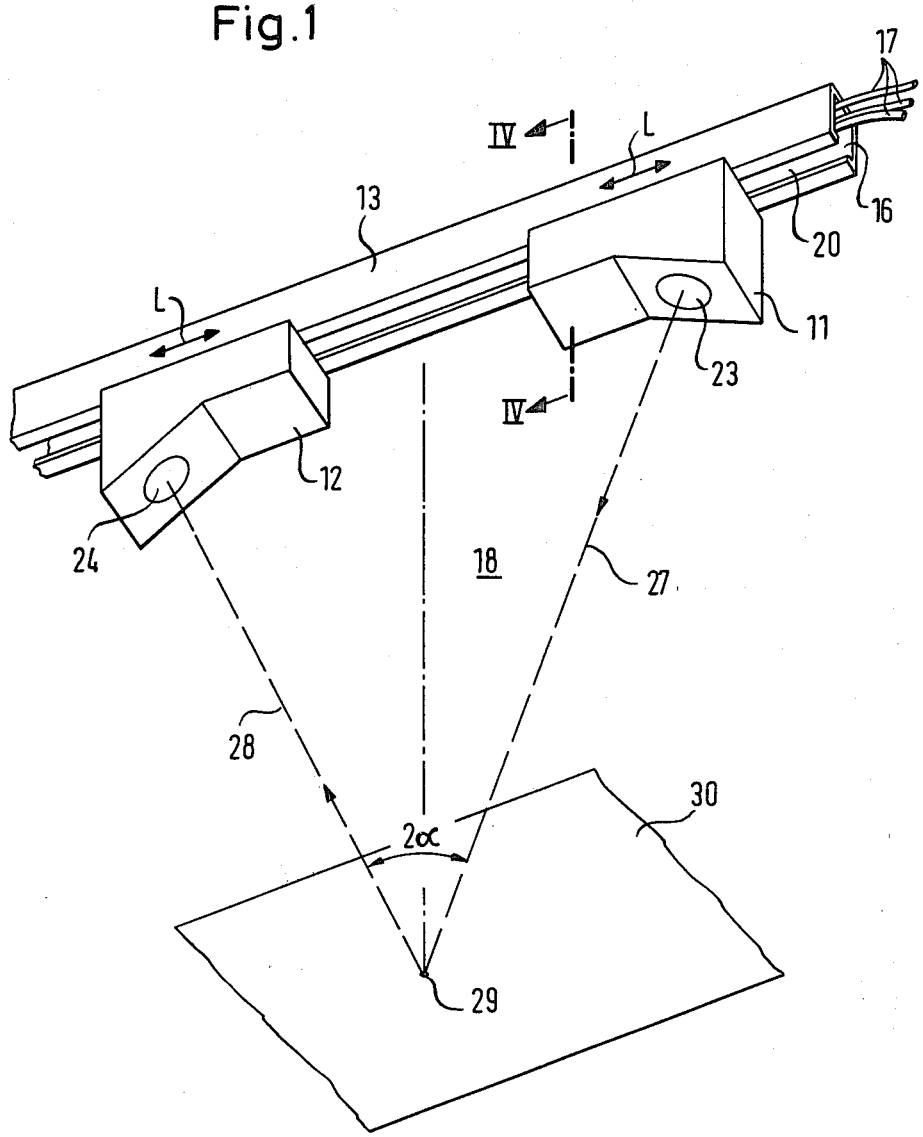

United States Patent [19]

Fetzer

[11] 4,346,293
[45] Aug. 24, 1982

[54] OPTICAL ELECTRONIC DISTANCE SENSOR WITH A PARALLEL BEAM OF LIGHT AND ADJUSTABLE DETECTOR-EMITTER SEPARATION

[75] Inventor: Günter Fetzer, Gundelfingen, Fed. Rep. of Germany

[73] Assignee: Erwin Sick GmbH - Optik-Elektronik, Fed. Rep. of Germany

[21] Appl. No.: 138,033

[22] Filed: Apr. 7, 1980

[30] Foreign Application Priority Data

Jun. 6, 1979 [DE] Fed. Rep. of Germany ... 7916322[U]

[51] Int. Cl.³ .............................................. G01V 9/04
[52] U.S. Cl. ................................ 250/222 R; 250/221
[58] Field of Search ............... 250/221, 222, 577, 216, 250/239; 356/1, 4

[56] References Cited

U.S. PATENT DOCUMENTS

| 2,081,134 | 5/1937 | Buckley | 250/222 R |
| 2,369,223 | 2/1945 | Ferger | 250/222 R |
| 2,871,370 | 1/1959 | Neubrech et al. | 250/222 R |
| 3,137,756 | 6/1964 | Gunther et al. | 356/1 |
| 3,516,056 | 6/1970 | Matthews | 250/222 R |

Primary Examiner—David C. Nelms
Attorney, Agent, or Firm—Townsend and Townsend

[57] ABSTRACT

An optical electronic distance sensor utilizes a V-light barrier in which a light transmitter 11 transmits a substantially parallel light beam 14 at a defined angle and a light receiver 12 receives a substantially parallel light beam 15 at a defined angle and delivers an electrical output signal dependent on the intensity of the received light beam. The distance of the intersection of the transmitted and received light beam paths, i.e. the apex of the V, from the light transmitter and receiver defines the sensing distance of the light barrier and is adjusted by adjusting the separation of the light transmitter and receiver. For this purpose the light transmitter and receiver are displaceably mounted on a mounting rail. The distance sensor is particularly useful in indoor carparks for determining the presence or absence of a vehicle in a parking space.

7 Claims, 4 Drawing Figures

OPTICAL ELECTRONIC DISTANCE SENSOR WITH A PARALLEL BEAM OF LIGHT AND ADJUSTABLE DETECTOR-EMITTER SEPARATION

The invention relates to an optical electronic distance sensor with a V-light barrier comprising a light transmitter for transmitting a substantially parallel light beam at a defined angle and a light receiver for receiving a substantially parallel light beam at a defined angle and for delivering an electrical output signal dependent on the intensity of the received light beam. The light transmitter and the light receiver are so spatially arranged relative to one another that the transmitted beam and the received beam intersect at a distance from the light transmitter and the light receiver.

Distance sensors of this kind are also referred to as V- or angle sensors. The term received light beam is applied to that portion of the light which reaches the light receiver and subsequently falls on the photodetector provided in the light receiver and plays a role in generating the electrical output signal. This received light beam is, so far as is possible, made parallel. In general, however, the received light beam is a so-called reception lobe which is, however, made as narrow as possible. In other words the light receiver used for the distance sensor of the present invention has a pronounced directional characteristic. If some object or other is located within the intersection region of the two beam cross-sections then the transmitted light is reflected from the object in all possible directions including the direction of the light receiver and this reflected light is used to generate a recognition signal. Objects which are located in front of, or behind, the intersection region are, however, not recognized because light reflected at the correct angle for reception at the light receiver does not, however, reach the light receiver and the light which does reach the light receiver by reason of the reflection of the object does not have the defined angle of the reception lobe so that it is concentrated alongside the photoelectric detector in the light receiver and does not result in the generation of a recognition signal.

Even parts of high reflectivity (such as mirrors), which are located in front of, or behind, the intersection region are not recognized. Mirrors within the intersection region are likewise also not reliably detected if their angular position is wrong.

In general scattered reflections occur at the objects whose distances from the distance sensor are to be specified. For specular reflection care must be taken that the transmitted and received light beams submit the respective angles for specular reflection at the object so that the transmitted light beam is reflected into the reception lobe when the object is present in the intersection region.

It is also possible to fixedly arrange an object which scatters light in the defined manner in the intersection region of the transmitted light beam and the received light beam or reception lobe. For this purpose a retroreflector can be considered but must have a reflection lobe with an aperture angle corresponding to the V of the light barrier. In an arrangement of this kind all optically non-transparent objects are recognized by interruption of the electrical output signal of the light receiver, even when they have specularly reflecting surfaces, when they are located in the transmitted light beam or in the reception lobe between transmitter/receiver and the intersection region.

It is a problem with optical electronic distance sensors to change the distance of the intersection region from the light transmitter or light receiver. This change can be carried out either by a change of the intersection angle between the two light beams or by a change of the spacing between the light transmitter and the light receiver. The first method has, however, the disadvantage that the range of resolved distances changes which is in many cases undesirable because the distance sensitivity of the sensor is deleteriously affected. For the hitherto known optical electronic sensors the change of the separation of the light transmitter and light receiver has been associated with a considerable degree of trouble and expense in relation to the installation and assembly of the units.

The principle object underlying the present invention is thus to provide an optical electronic distance sensor of the kind initially named in which the sensed distance can be preadjusted or adjusted to a desired value without changing the range of resolved distances to which the sensor responds and avoiding troublesome or expensive measures for the mounting and alignment of the separate light transmitter and receiver units.

For accomplishing this task the invention envisages an arrangement in which the light transmitter and the light receiver are diaplaceably mounted on a mounting rail. The mounting rail is preferably straight and lies in the plane defined by the transmitted and received light beams.

It is particularly advantageous if the light transmitter and the light receiver are fixable in each position to which they are displaceable.

By reason of the construction proposed by the invention the light receiver and the light transmitter can be adjusted by linear displacement along the base of the V to any separation which is allowed by the length of the rail. As a result the intersection range of the transmitted and received light beams can be placed at a greater or lesser distance from the mounting rail. The sensed distance can thus be adjusted in the simplest of manners to any desired value within the preset range.

A particular advantage of the invention is that commercially available standard rails can be used for the mounting rails so that it is only necessary to equip the light transmitter and light receiver with corresponding cooperating sliders which fit the standard rails.

It is furthermore advantageous for the mounting rail to have a hollow cavity extending in its longitudinal direction for housing electrical connection cables. The electrical wiring can thus be housed out of sight, and protected from external influences, in a simple manner.

The invention also makes it possible to arrange several light transmitters and light receivers alternately one behind the other on a long mounting rail with pairs of light transmitters and light receivers forming respective V-light barriers. An embodiment of this kind is particularly suitable for use in carparks. In this arrangement a long mounting rail is arranged over a row of parking places and carries a V-light barrier for each park place. The intersection region of the transmitted and received light beams is located on the floor of the parking space so that when a vehicle is present in the parking space the recognition signal, which is otherwise received by scattered reflection at the floor, is interrupted. The interruption is used to indicate the presence of a vehicle. If no vehicle is present in the parking space then the recognition signal is present and indicates that a parking place is free. The invention can thus be used in simple manner to monitor the presence or absence of vehicles in the parking spaces in carparks.

Figure 2:
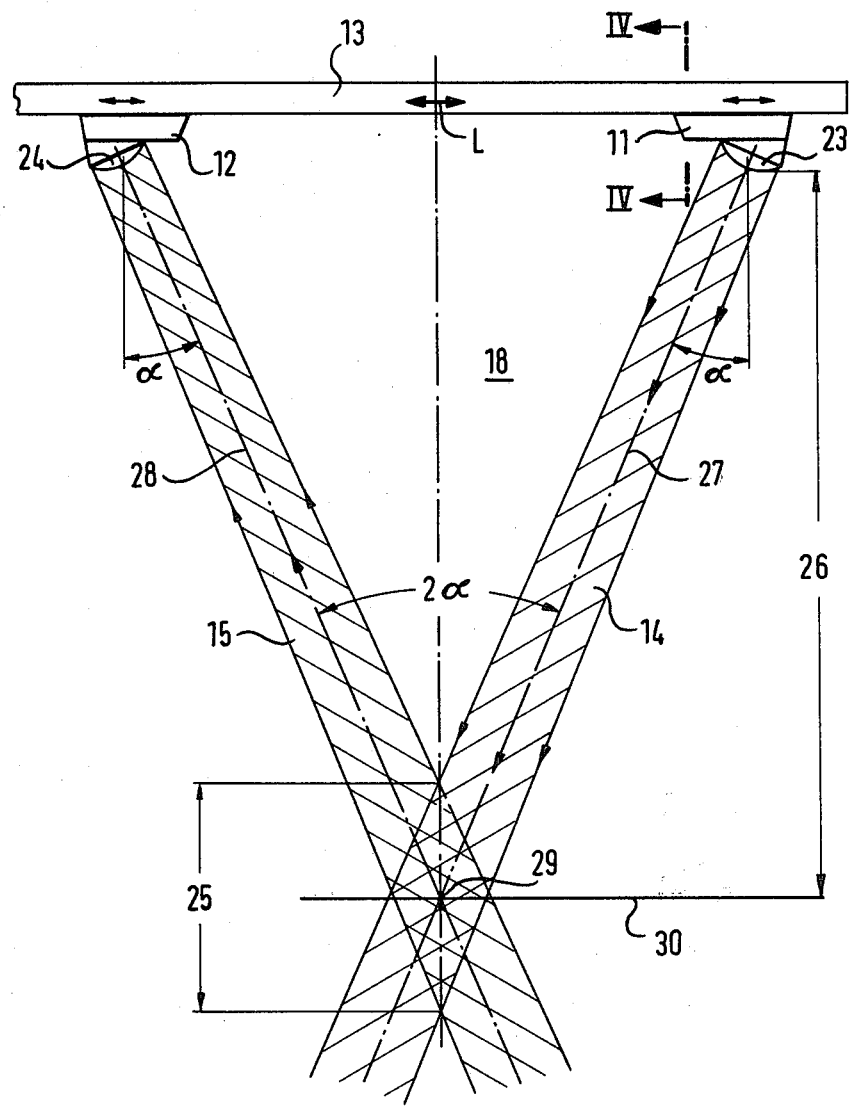
Figure 3:
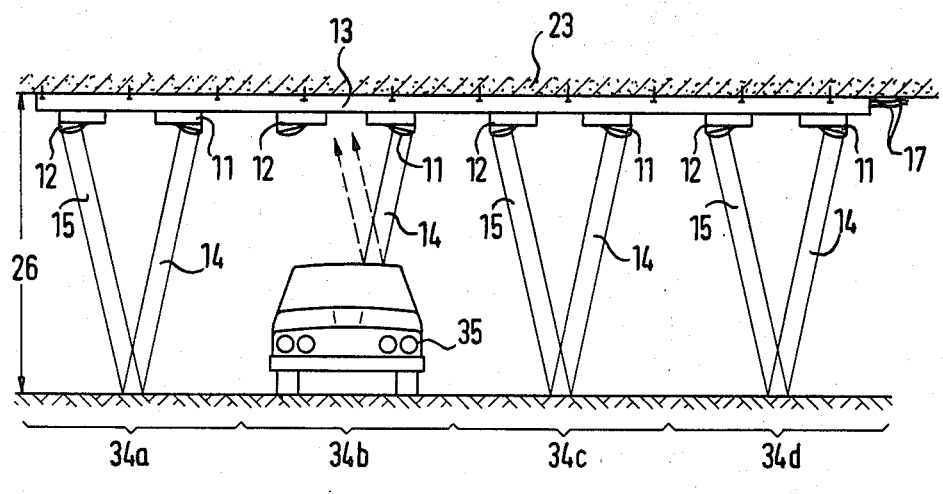
Figure 4:
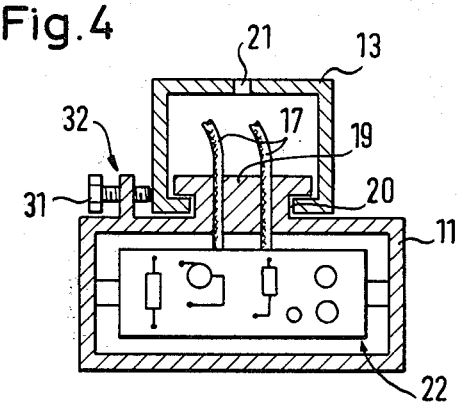

The invention will now be described in the following by way of example only and with reference to the drawings in which are shown:

FIG. 1—a perspective view of an optical electronic distance sensor based on a V-light barrier, FIG. 2—a schematic sectional view of an optical electronic distance sensor such as the sensor of FIG. 1 and sectioned in the plane of the V-light barrier, FIG. 3—a schematic view of a particularly preferred embodiment of the optical electronic distance sensor as used in an indoor carpark and FIG. 4—an enlarged section on the line IV—IV of FIGS. 1 and 2.

Referring firstly to FIGS. 1 and 2 a light transmitter 11 and a light receiver 12 are displaceably arranged in the longitudinal direction L of a mounting rail 13 which is for example fastened to the ceiling of a building. This displaceable arrangement of the light transmitter and light receiver is enabled by the arrangement of FIG. 4 in which a T-guide or sliding element 19 is attached to the upper sides of each of the light transmitter 11 and the light receiver 12. The T-guide engages in the mounting rail 13 from beneath the rail in the illustrated manner. The mounting rail 13 is constructed as a box profile of approximately square cross-section in which the lower side of the profile has a guide slot 20 extending in the longitudinal direction of the rail. The T-profile 19 engages in the manner shown in FIG. 4 behind the margins of the guide slot 20.

The rail 13 has installations bores 21 at suitable intervals along its length by means of which it can be fastened onto the ceiling of a building.

The electronic and optical components necessary for the generation and transmission of a parallel light beam 14 are arranged inside the light transmitter 11 and are referenced in FIGS. 1, 2 and 4 with reference numerals 22 and 23. In corresponding fashion the light receiver 12 has the optical elements 24 necessary for receiving a substantially parallel light beam 15 and also the electronic components required to convert the received light into an electrical signal. The specific construction of the individual light transmitter and receiver units is not here described in detail but will be readily apparent to the person skilled in the art on the basis of numerous previous disclosures.

The electrical cables 17 necessary to connect the light transmitter 11 and the light receiver 12 with control and display apparatus emerge, in the manner which can be seen from FIG. 4, from the light transmitter and the light receiver and are led inside the hollow space 16 of the mounting rail 13 to an end face of the rail from where the connection can be made to further lines.

As can be seen from FIG. 2 the optical elements 23, 24 of the light transmitter and light receiver 12 are arranged at an angle $\alpha$ to the longitudinal direction of the straight mounting rail 13. The transmitted light beam 14 and the received light beam 15 are guided in a plane 18 which also contains the mounting rail 13. The two beams 14, 15 thus intersect within the so-called range of resolved distances 25. As can be seen from FIG. 2 the sensed distance 26 is defined as the perpendicular distance from the front lens 23 of the light beam 11 to the point of intersection of the main rays 27, 28 of the light beams 14, 15.

The light beam 15 defines the pronounced directional characteristic of the light receiver 12. Expressed differently the light receiver 12 has a very narrow reception lobe so that, from light which impinges on the light receiver 12 from all possible directions, only the beam 15 is used for generating an electrical output signal.

Thus, in accordance with the invention the two main beams 27, 28 intersect at the angle $2\alpha$. In FIG. 1 only the two main rays 27, 28 are shown for the sake of simplicity of the illustration.

The installation and manner of operation of the described optical electronic distance sensor are as follows.

After the mounting rail 13 has been installed at its location of use the light transmitter 11 and the light receiver 12 are slid along the rail 13 until the intersection point 29 of the two main beams 27, 28 is located at the light scattering sensing plane 30, for example in accordance with FIG. 3 on the floor of a parking space 34.

The light transmitter 11 and the light receiver 12 can now be fixed in the relevant positions and this can take place for example in the manner shown in FIG. 4 by a clamping device 32 which utilizes a clamping screw 31.

The distance sensor is now fixedly adjusted for the sensing distance 26. If an object which interrupts the light path is now introduced between the light barrier and the start of the resolved distance sensing range 25 the light receiver 12 receives no radiation and provides a corresponding electrical signal at its outlet. This signal forms a measure for the recognition of the presence of an object. If in contrast no object is located between the light barrier and the resolved distance sensing range then sufficient light reaches the light receiver 12 in order to avoid the appearance of a recognition signal.

In FIGS. 1 and 2 the mounting rail 13 is illustrated broken away at its left hand end for the purposes of illustration. The rail has an overall length which corresponds to the length of the maximum sensing distance 26.

As seen in FIG. 3 the mounting rail 13 can, however, have a length which is a multiple of the length which is necessary for a single V-light barrier. In a construction of this kind several light transmitters and light receivers 12 can be arranged alternately one behind the other along the length of the rail so that each sequential pair of the light transmitters and light receivers forms a V-light barrier. In FIG. 3 a long mounting rail 13 of this kind is shown fastened to the ceiling 33 of an indoor carpark. Each pair of light transmitter 11 and light receiver 12 units is located above a respective parking space 34a, 34b, 34c, 34d. The sensed distance 26 is chosen such that it is located on the floor of the parking space 34. In FIG. 3 a vehicle 35 is illustrated by way of example in the parking space 34b. The corresponding widths of the beams 14, 15 and also their angles to one another ensure that none of the light reflected from the vehicle 35 is detected.

The optical electronic distance sensor in accordance with the invention can thus determine whether or not a vehicle is located in a parking space 34.

If no vehicle is present in the parking space the light receiver 12 receives a signal because light is scattered from the floor 34 to the light receiver 12. If, in contrast, a vehicle is located in the parking space then the light receiver 12 receives no light as can be seen from the dotted line illustration in respect of the parking space 34b.

The intersection range thus lies on the floor and the receiver 12, by reason of its angular position, only recognizes light which is reflected from the floor. The floor itself reflects the light in a diffuse manner and the vehicle (which is always higher than the floor) interrupts the effective light beam. It is thus immaterial whether the vehicle reflects well or poorly and whether the reflected light is directed or diffusely reflected. Furthermore, the height of the vehicle plays no role for this kind of recognition apparatus.

It will be appreciated by those skilled in the art that various modifications may be made to the described arrangement without departing from the scope of the present teaching.

We claim:

1. V-light barrier apparatus for sensing the presence and absence of an object on a surface, comprising a straight mounting rail extending in a first direction, a light transmitter mounted on said rail and constructed to transmit a parallel beam of light along a transmitted beam path at a fixed and invariable angle relative to said rail, a light receiver mounted on said rail and constructed to receive a parallel beam of light along a received beam path at a fixed and invariable angle relative to said rail, with the transmitted beam path and the received beam path intersecting over an intersection region at a distance from said rail, means enabling movement of said light transmitter and said light receiver along said rail to adjust their relative separation, and thereby said distance, to bring said intersection region into coincidence with one of said surface and said object without varying the size or shape of said intersection region, and means for securing said light transmitter and said light receiver to said mounting rail.

2. Apparatus in accordance with claim 1 and wherein the mounting rail has a hollow cavity extending in its longitudinal direction for housing electrical connection cables for the light transmitter and receiver.

3. Apparatus according to claim 1, comprising a plurality of light transmitters and a plurality of light receivers, said transmitters being mounted on said rail alternately with said receivers to form a plurality of V-light barriers.

4. Apparatus in accordance with claim 1, wherein said mounting rail has a box profile and a guide slot along one side thereof and wherein said means enabling movement of said light transmitter and said light receiver comprises T-guides fixed to each of said light transmitter and light receiver, each of said T-guides being engageable in said box profile and slidable relative thereto.

5. Apparatus in accordance with claim 4, wherein said means for securing said light transmitter and said light receiver to said mounting rail comprises clamp screws associated with each of said light transmitter and light receiver for releasably clamping said light transmitting and said light receiver to said rail.

6. In optical electronic distance sensing apparatus including light transmitting means for directing transmitted light at a surface and light receiving means for receiving transmitted light reflected from said surface and providing an electrical signal in response thereto, the improvement wherein:

said light transmitting means transmits a substantially parallel beam of light in a first predetermined direction;

said light receiving means is sufficiently directional to receive a substantially parallel beam of light from a second predetermined direction;

said first and second predetermined directions are selected so that the range of resolved distances of said sensing apparatus has a predetermined magnitude; and means for adjusting the axial separation of said light transmitting means and said light receiving means, whereby the separation of the range of resolved distances from the sensing apparatus can be varied.

7. Adjustable V-light barrier apparatus having a range of resolved distances of constant predetermined magnitude for sensing the presence or absence of an object on a surface, comprising:

light transmitter means producing a substantially parallel transmitted beam of light;

highly directional light receiving means for receiving a substantially parallel received beam of light; and means for mounting said light transmitter means and said light receiving means in fixed, predetermined, angular relation to one another and in adjustable, spaced-apart relation to one another, said predetermined angular relation being selected so that said transmitted beam and said received beam intersect in a range of resolved distances equal to said predetermined magnitude, and said spaced-apart relation being adjustable to position said range of resolved distances at one said surface and said object.

* * * * *